US010132593B2

(12) United States Patent
White et al.

(10) Patent No.: US 10,132,593 B2
(45) Date of Patent: *Nov. 20, 2018

(54) MULTI-TURN ELEVATION KNOB FOR OPTICAL DEVICE

(71) Applicant: BURRIS CORPORATION, Greeley, CO (US)

(72) Inventors: Matthew Travis White, Fort Collins, CO (US); Seth Alan Feinberg, Greeley, CO (US); Matthew David Joyner, Fort Collins, CO (US)

(73) Assignee: BURRIS CORPORATION, Greeley, CO (US)

( * ) Notice: Subject to any disclaimer, the term of this patent is extended or adjusted under 35 U.S.C. 154(b) by 79 days.

This patent is subject to a terminal disclaimer.

(21) Appl. No.: 15/243,709

(22) Filed: Aug. 22, 2016

(65) Prior Publication Data

US 2017/0010068 A1 Jan. 12, 2017

Related U.S. Application Data

(63) Continuation of application No. 14/554,745, filed on Nov. 26, 2014, now Pat. No. 9,423,215.

(51) Int. Cl.
*F41G 1/38* (2006.01)
*F41G 3/08* (2006.01)
*F41G 1/16* (2006.01)

(52) U.S. Cl.
CPC ............... *F41G 1/38* (2013.01); *F41G 1/16* (2013.01); *F41G 3/08* (2013.01)

(58) Field of Classification Search
CPC ........................................... F41G 1/38

USPC ........................ 33/1 N, 281, 282, 285, 534
See application file for complete search history.

(56) References Cited

U.S. PATENT DOCUMENTS

| 691,248 | A | 1/1902 | De Zeng, Jr. |
| 722,910 | A | 3/1903 | Saegmuller |
| 773,813 | A | 11/1904 | Saegmuller |
| 830,729 | A | 9/1906 | Mann |
| 870,273 | A | 11/1907 | Burton |

(Continued)

FOREIGN PATENT DOCUMENTS

| CN | 201145779 | 11/2008 |
| CN | 201378019 | 1/2010 |

(Continued)

OTHER PUBLICATIONS

PCT International Search Report and Written Opinion in International Application PCT/US2015/062130, dated Feb. 11, 2016, 9 pgs.

*Primary Examiner* — G. Bradley Bennett

(57) ABSTRACT

An optical device has a post and a reference. A knob is rotatably connected to the optical device and has see-though portions and a gear pivotably disposed therein. The gear has a ring engagement member and a receiver for receiving the post and an inner ring is disposed within the housing. The inner ring includes a first indicia and second indicia. The first indicia are aligned with the plurality of see-through portions when the gear is in a first position. The second indicia are aligned with the plurality of see-through portions when the gear is in a second position. Each of the first and second indicia is associated with a single specific rotated position of the housing relative to the reference.

24 Claims, 13 Drawing Sheets

(56) References Cited

U.S. PATENT DOCUMENTS

| | | | |
|---|---|---|---|
| 960,813 A | 6/1910 | Burton |
| 1,609,405 A | 12/1926 | Fagerholm |
| 2,381,101 A | 8/1945 | Bausch |
| 2,424,011 A | 7/1947 | Gramo |
| 2,548,031 A | 4/1951 | Leupold |
| 2,579,067 A | 12/1951 | Cunningham |
| 2,782,509 A | 2/1957 | Ivy |
| 2,839,834 A | 6/1958 | Hardy |
| 2,911,723 A | 11/1959 | Ashbrook |
| 3,153,856 A | 10/1964 | Felix |
| 3,183,594 A | 5/1965 | Panunzi |
| 3,315,362 A | 4/1967 | Palmer |
| 3,374,544 A | 3/1968 | Pitchford |
| 3,401,460 A | 9/1968 | Tellie |
| 3,611,606 A | 10/1971 | Sefried et al. |
| 3,669,523 A | 6/1972 | Edwards |
| 3,734,437 A | 5/1973 | Underwood |
| 3,828,443 A | 8/1974 | James |
| D234,539 S | 3/1975 | Marchetti |
| D234,540 S | 3/1975 | Marchetti |
| 3,877,166 A | 4/1975 | Ward |
| 3,959,888 A | 6/1976 | Baker et al. |
| 3,994,597 A | 11/1976 | Calder et al. |
| 4,208,801 A | 6/1980 | Blair |
| 4,264,123 A | 4/1981 | Mabie |
| 4,523,818 A | 6/1985 | Lang et al. |
| 4,531,052 A | 7/1985 | Moore |
| 4,571,870 A | 2/1986 | Heideman et al. |
| 4,630,903 A | 12/1986 | Jones |
| 4,643,542 A | 2/1987 | Gibson |
| 4,695,161 A | 9/1987 | Reed |
| 4,776,126 A | 10/1988 | Williams |
| 4,777,754 A | 10/1988 | Reynolds, Jr. |
| 4,845,871 A | 7/1989 | Swan |
| 5,305,978 A | 4/1994 | Current |
| 5,343,744 A | 9/1994 | Ammann |
| 5,363,559 A * | 11/1994 | McCarty ............. F41G 1/38 33/298 |
| 5,400,540 A | 3/1995 | Solinsky et al. |
| 5,408,359 A | 4/1995 | Ferrett et al. |
| 5,426,880 A | 6/1995 | Ruger et al. |
| 5,430,967 A | 7/1995 | Woodman, III et al. |
| 5,433,010 A | 7/1995 | Bell |
| 5,506,727 A | 4/1996 | Douglas et al. |
| 5,531,031 A | 7/1996 | Green |
| 5,584,137 A | 12/1996 | Teetzel |
| 5,771,623 A | 6/1998 | Pernstich et al. |
| 5,783,745 A | 7/1998 | Bergman |
| 5,784,207 A | 7/1998 | Satoh |
| 5,920,995 A | 7/1999 | Sammut |
| 5,941,489 A | 8/1999 | Fanelli et al. |
| 5,973,315 A | 10/1999 | Saldana et al. |
| 6,012,229 A | 1/2000 | Shiao |
| 6,032,374 A | 3/2000 | Sammut |
| 6,185,854 B1 | 2/2001 | Solinsky et al. |
| 6,269,581 B1 | 8/2001 | Groh |
| 6,363,223 B1 | 3/2002 | Gordon |
| 6,442,883 B1 | 9/2002 | Waterman et al. |
| 6,453,595 B1 | 9/2002 | Sammut |
| 6,516,551 B2 | 2/2003 | Gaber |
| 6,516,699 B2 | 2/2003 | Sammut et al. |
| 6,574,901 B1 | 6/2003 | Solinsky et al. |
| 6,580,555 B2 | 6/2003 | Crista |
| 6,580,876 B1 | 6/2003 | Gordon |
| 6,595,473 B2 | 7/2003 | Aoki |
| 6,606,813 B1 | 8/2003 | Squire et al. |
| 6,608,298 B2 | 8/2003 | Gaber |
| 6,615,531 B1 | 9/2003 | Holmberg |
| 6,629,381 B1 | 10/2003 | Keng |
| 6,681,512 B2 | 1/2004 | Sammut |
| 6,721,095 B2 | 4/2004 | Huber |
| 6,729,062 B2 | 5/2004 | Thomas et al. |
| 6,792,206 B2 | 9/2004 | Gordon |
| 6,807,742 B2 | 10/2004 | Schick et al. |
| 6,813,025 B2 | 11/2004 | Edwards |
| 6,819,495 B2 | 11/2004 | Shani et al. |
| 6,862,832 B2 | 3/2005 | Barrett |
| 6,875,918 B2 | 4/2005 | Sudo |
| 7,119,275 B2 | 10/2006 | Suzuki |
| 7,121,037 B2 | 10/2006 | Penney |
| 7,125,126 B2 | 10/2006 | Yamamoto |
| 7,129,857 B1 | 10/2006 | Spirkovska |
| 7,292,262 B2 | 11/2007 | Towery et al. |
| 7,309,054 B2 | 12/2007 | Slatter et al. |
| 7,317,520 B2 | 1/2008 | Wang et al. |
| 7,343,707 B2 | 3/2008 | Smith, III |
| 7,656,579 B1 | 2/2010 | Millett |
| 7,665,699 B2 | 2/2010 | Oddsen, Jr. et al. |
| 7,703,679 B1 | 4/2010 | Bennetts et al. |
| 7,905,046 B2 | 3/2011 | Smith, III |
| 8,006,430 B2 | 8/2011 | Wang |
| D651,682 S * | 1/2012 | Beckett ............. F41G 1/38 D22/109 |
| 8,201,741 B2 | 6/2012 | Bennetts et al. |
| 8,353,454 B2 | 1/2013 | Sammut et al. |
| 8,397,421 B2 | 3/2013 | Ding et al. |
| 8,555,542 B2 | 10/2013 | Ziegler |
| 8,833,655 B2 | 9/2014 | McCarty et al. |
| 8,919,650 B2 | 12/2014 | Browe et al. |
| 9,038,901 B2 | 5/2015 | Paterson et al. |
| 9,091,507 B2 | 7/2015 | Paterson et al. |
| 9,250,036 B2 | 2/2016 | Farca et al. |
| 9,423,215 B2 * | 8/2016 | White ............. F41G 3/08 |
| 9,482,516 B2 | 11/2016 | McCarthy et al. |
| 9,689,643 B2 | 6/2017 | Farca et al. |
| 2002/0089752 A1 | 7/2002 | Morgan, III |
| 2003/0010190 A1 | 1/2003 | Sammut et al. |
| 2003/0145505 A1 | 8/2003 | Kenton |
| 2003/0163278 A1 | 8/2003 | Clark et al. |
| 2004/0047586 A1 | 3/2004 | Schick et al. |
| 2004/0068913 A1 | 4/2004 | Solinsky et al. |
| 2004/0082888 A1 | 4/2004 | Palazzolo et al. |
| 2004/0088898 A1 | 5/2004 | Barrett |
| 2004/0144013 A1 | 7/2004 | Leatherwood |
| 2004/0187374 A2 | 9/2004 | Solinsky et al. |
| 2004/0231220 A1 | 11/2004 | McCormick |
| 2004/0234812 A1 | 11/2004 | Naito et al. |
| 2004/0238714 A1 | 12/2004 | Slatter et al. |
| 2005/0002668 A1 | 1/2005 | Gordon |
| 2005/0021282 A1 | 1/2005 | Sammut et al. |
| 2005/0036109 A1 | 2/2005 | Blum et al. |
| 2005/0200959 A1 | 9/2005 | Yamamoto |
| 2005/0219690 A1 | 10/2005 | Lin et al. |
| 2005/0252062 A1 | 11/2005 | Scrogin et al. |
| 2005/0263688 A1 | 12/2005 | Kauhanen |
| 2005/0268521 A1 | 12/2005 | Cox et al. |
| 2006/0010759 A1 | 1/2006 | Penney |
| 2006/0010760 A1 | 1/2006 | Perkins et al. |
| 2006/0162226 A1 | 7/2006 | Tai |
| 2006/0164704 A1 | 7/2006 | Sieczka et al. |
| 2006/0187562 A1 | 8/2006 | Mounnarat et al. |
| 2007/0035824 A1 | 2/2007 | Scholz |
| 2007/0086893 A1 | 4/2007 | Pedersen |
| 2007/0096000 A1 | 5/2007 | Westberg |
| 2007/0097351 A1 | 5/2007 | York et al. |
| 2007/0234626 A1 | 10/2007 | Murdock et al. |
| 2007/0277421 A1 | 12/2007 | Perkins et al. |
| 2008/0007843 A1 | 1/2008 | Schafer |
| 2008/0022576 A1 | 1/2008 | Epling |
| 2008/0140331 A1 | 6/2008 | Kalinin |
| 2008/0186568 A1 | 8/2008 | Chen et al. |
| 2009/0266892 A1 | 10/2009 | Windauer et al. |
| 2010/0024276 A1 | 2/2010 | Kellis |
| 2010/0301116 A1 | 12/2010 | Bennetts et al. |
| 2011/0061286 A1 | 3/2011 | Wang |
| 2011/0075125 A1 | 3/2011 | Kanayama |
| 2011/0099881 A1 | 5/2011 | Jung et al. |
| 2011/0247255 A1 | 10/2011 | Ding et al. |
| 2012/0000979 A1 | 1/2012 | Horvath et al. |
| 2012/0044475 A1 | 2/2012 | Yang et al. |
| 2012/0048931 A1 | 3/2012 | Arbouw |
| 2012/0097741 A1 | 4/2012 | Karcher |
| 2012/0182417 A1 | 7/2012 | Everett |
| 2012/0186130 A1 | 7/2012 | Tubb |

(56) References Cited

U.S. PATENT DOCUMENTS

| | | |
|---|---|---|
| 2012/0298750 A1 | 11/2012 | McCarty et al. |
| 2013/0033746 A1 | 2/2013 | Brumfield |
| 2013/0040268 A1 | 2/2013 | Van Der Walt et al. |
| 2013/0047485 A1 | 2/2013 | Tubb |
| 2013/0170027 A1 | 7/2013 | Peters et al. |
| 2013/0188180 A1 | 7/2013 | Jakob |
| 2013/0199074 A1 | 8/2013 | Paterson et al. |
| 2013/0206836 A1 | 8/2013 | Paterson et al. |
| 2013/0228618 A1 | 9/2013 | Millett |
| 2013/0276345 A1 | 10/2013 | Hamilton |
| 2013/0312310 A1 | 11/2013 | Geller |
| 2014/0002815 A1 | 1/2014 | Jaeschke et al. |
| 2014/0059915 A1 | 3/2014 | Sammut et al. |
| 2014/0319215 A1 | 10/2014 | Farca et al. |
| 2015/0002856 A1 | 1/2015 | McCarthy et al. |
| 2015/0241193 A1 | 8/2015 | Berthiaume |
| 2015/0316350 A1 | 11/2015 | Hamilton |
| 2016/0025455 A1 | 1/2016 | Paterson et al. |
| 2016/0084616 A1 | 3/2016 | Jahromi |
| 2016/0097628 A1 | 4/2016 | Wu |
| 2016/0146576 A1 | 5/2016 | White et al. |
| 2016/0252330 A1 | 9/2016 | Babbitt et al. |
| 2017/0241742 A1* | 8/2017 | Davidson .................. F41G 1/38 |
| 2018/0010887 A1* | 1/2018 | VanBecelaere ........ G02B 7/004 |
| 2018/0024376 A1* | 1/2018 | Dohr ....................... F41G 1/345 |

FOREIGN PATENT DOCUMENTS

| | | |
|---|---|---|
| CN | 101706232 | 5/2010 |
| CN | 201740465 | 2/2011 |
| CN | 201844750 | 5/2011 |
| DE | 20 2005 015445 | 1/2006 |
| DE | 102011018947 | 10/2012 |
| DE | 10 2012 000525 | 7/2013 |
| EP | 2339290 | 6/2011 |
| WO | 00/50836 | 8/2000 |
| WO | 03/096216 | 11/2003 |
| WO | 2007/108896 | 9/2007 |
| WO | 2007/108896 A2 | 9/2007 |
| WO | 2010/134738 | 11/2010 |

\* cited by examiner

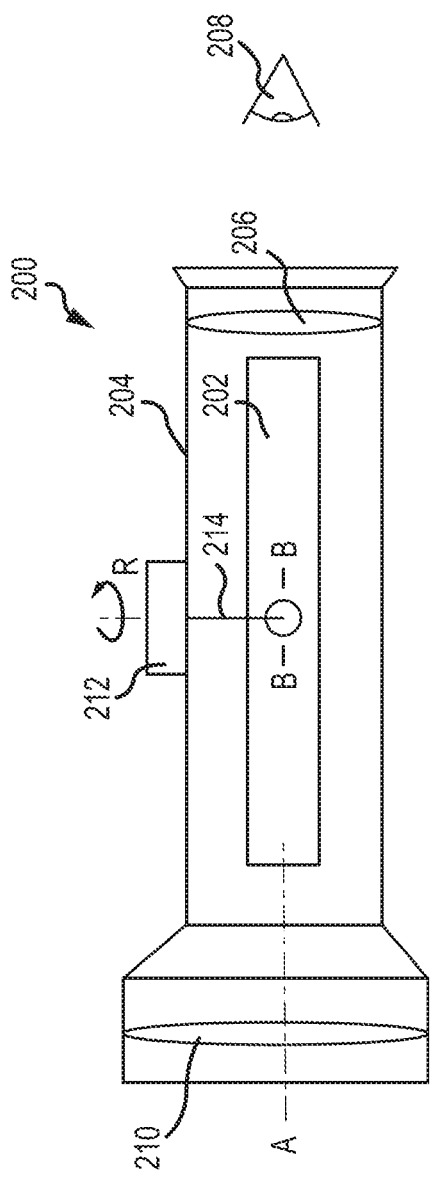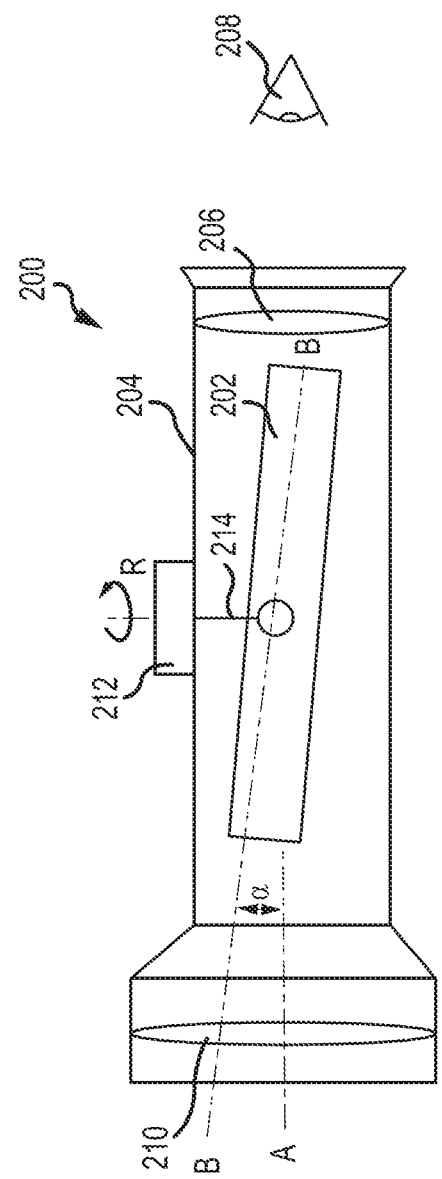

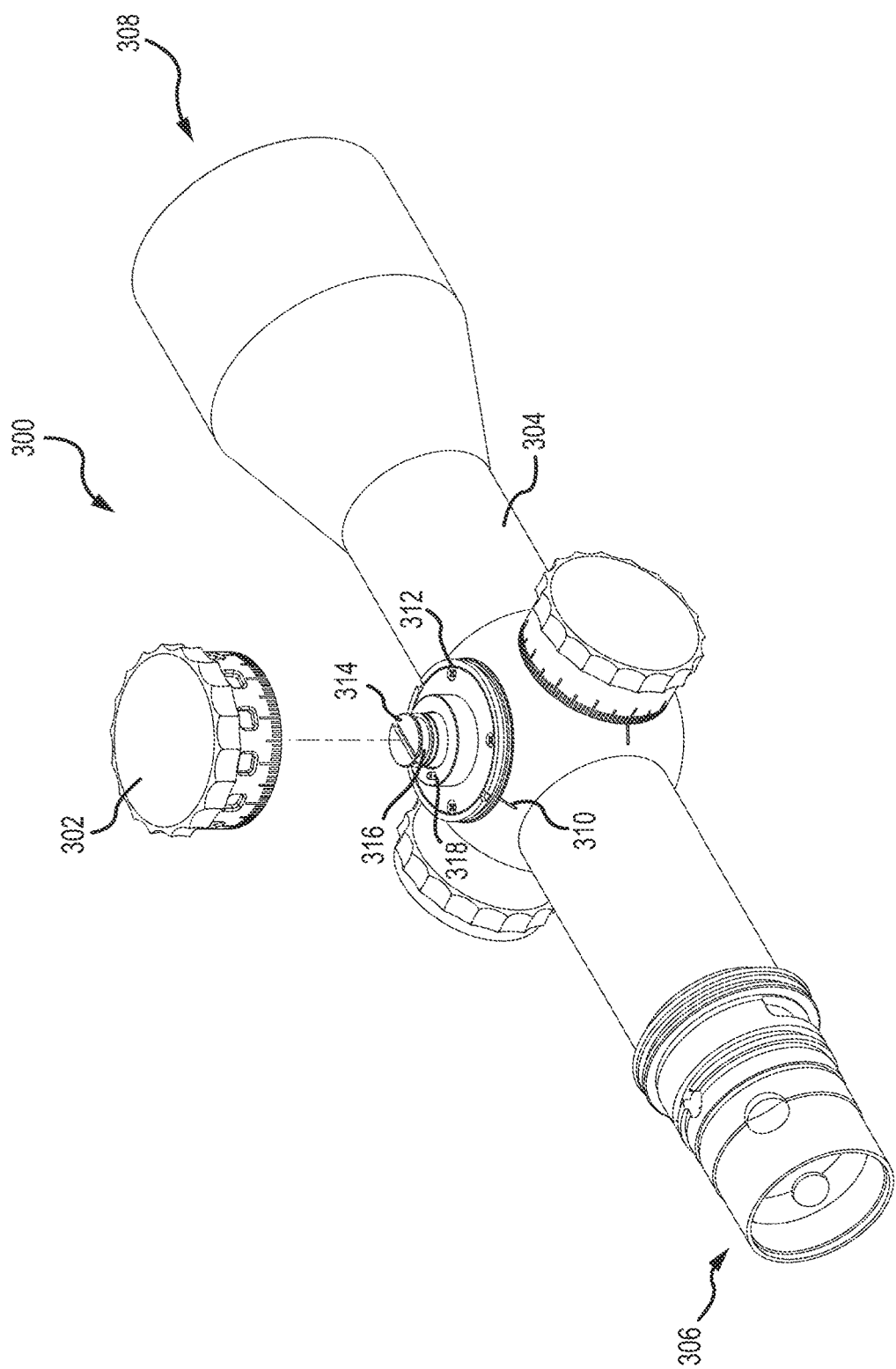

MULTI-TURN ELEVATION KNOB FOR OPTICAL DEVICE

CROSS-REFERENCE TO RELATED APPLICATIONS

This application is a continuation of U.S. Application No. 14/554,745, filed Nov. 26, 2014, entitled "MULTI-TURN ELEVATION KNOB FOR OPTICAL DEVICE", the disclosure of which is hereby incorporated by reference herein in its entirety.

INTRODUCTION

Aiming a rifle or gun requires the consideration of several environmental and other types of factors. When a bullet travels from a rifle to an intended target, several forces affect the flight of the bullet. Gravity causes the bullet to drop in elevation as the bullet travels from the firearm to the target. If a hunter 100 is close to his/her target 102, as shown in FIG. 1A, the bullet drops very little, represented by the trajectory 104. However, improvements in firearms and ammunition have allowed hunters to target game or target-shooting targets from extremely long distances. At these greater distances, gravity causes a bullet to drop in elevation more significantly, as represented by the trajectory 106 in FIG. 1B. As the distance between shooter and target increases, greater adjustments of an elevation knob on the optical device are required to properly sight a target.

SUMMARY

In one aspect, the technology relates to an apparatus having: an optical device having a post extending from the optical device and a reference disposed on an outer surface of the optical device; and a knob rotatably connected to the optical device proximate the post and the reference, the knob having: a housing having a plurality of see-though portions; a gear pivotably disposed within the housing, wherein the gear includes a ring engagement member and a receiver for receiving the post; and an inner ring disposed within the housing, wherein the inner ring is engaged with the ring engagement member, and wherein the inner ring has: a plurality of first indicia, each of the plurality of first indicia associated with a single specific first rotated position of the housing relative to the reference, wherein the plurality of first indicia are aligned with the plurality of see-through portions when the gear is in a first position; and a plurality of second indicia, each of the plurality of second indicia associated with a single specific second rotated position of the housing relative to the reference, wherein the plurality of second indicia are aligned with the plurality of see-through portions when the gear is in a second position. In an embodiment, the apparatus further includes a stop extending from the housing and engaged with the inner ring when both the plurality of first indicia and the plurality of second indicia are visible through the plurality of see-through portions. In another embodiment, engagement between the stop and the inner ring when the plurality of first indicia are visible, and contact between the post and an outer portion of the receiver, prevents a further rotation of the knob. In yet another embodiment, engagement between the stop and the inner ring when the plurality of second indicia are visible, and contact between the post and an outer portion of the receiver prevents a further rotation of the knob. In still another embodiment, the plurality of see-though portions includes openings defined by the housing.

In another embodiment of the above aspect, the apparatus further includes a substantially transparent ring disposed between the inner ring and the housing, wherein the plurality of first indicia and the plurality of second indicia are selectively visible through the openings and the substantially transparent ring. In an embodiment, the housing has an upper portion and wherein the knob further includes a gasket disposed between the upper portion and a top surface of the inner ring and a top surface of the substantially transparent ring. In another embodiment, the apparatus further includes a ring clip disposed proximate a bottom surface of the inner ring and a bottom surface of the substantially transparent ring. In yet another embodiment, the ring clip biases the inner ring and the substantially transparent ring toward the gasket. In still another embodiment, a rotating movement of the knob adjusts an angular position of at least one lens disposed in the optical device. In still another embodiment, the gear includes a clocking plate and the post includes a clocking pin.

In another aspect, the technology relates to an apparatus having: a housing having: a plurality of arc portion indicators, wherein the plurality of arc portion indicators include a single reference indicator; a plurality of see-through portions, wherein each see-through portion is aligned with a specific arc portion indicator of the plurality of arc portion indicators; a gear pivotably disposed within the housing between a first position and a second position; and an inner ring engaged with the gear and disposed within the housing, wherein the inner ring includes: a plurality of first numeric indicia, wherein each of the plurality of first numeric indicia indicate an arc portion position remote from the single reference indicator, wherein the plurality of first numeric indicia are aligned with the plurality of see-through portions when the gear is in the first position; and a plurality of second numeric indicia, wherein each of the plurality of second numeric indicia indicate an arc portion position remote from the reference indicator plus a constant, wherein the plurality of second numeric indicia are aligned with the plurality of see-through portions when the gear is in the second position. In an embodiment, the constant corresponds to a total number of the plurality of see-through portions in the housing. In another embodiment, the constant corresponds to a multiple of a total number of the plurality of see-through portions in the housing. In yet another embodiment, the plurality of first numeric indicia and the plurality of second numeric indicia are disposed in alternating positions about the inner ring. In still another embodiment, the apparatus further includes a ring element disposed between the inner ring and the housing.

In another embodiment of the above aspect, the ring element has a gasket disposed proximate an upper surface of the inner ring. In an embodiment, the ring element has a substantially transparent ring disposed proximate an outer surface of the inner ring. In another embodiment, the see-through portions has openings defined by the housing. In yet another embodiment, the apparatus further includes a ring clip for securing the inner ring into the housing. In still another embodiment, the apparatus further includes a stop extending from the housing and engaged with the inner ring when both the plurality of first numeric indicia and the plurality of second numeric indicia are visible through the plurality of see-through portions. In yet another embodiment, the apparatus further has a shoulder disposed on the interior of the housing. In still another embodiment, the apparatus further includes a securement element proximate the shoulder for securing the housing to an adjustment element of an optical device.

BRIEF DESCRIPTION OF THE DRAWINGS

There are shown in the drawings, embodiments which are presently preferred, it being understood, however, that the technology is not limited to the precise arrangements and instrumentalities shown.

FIGS. 2A-2B depict schematic cross-sectional views of an optical device having a sighting lens system in a first position and a second position.

FIG. 3 depicts a partial exploded perspective view of an optical device utilizing a multi-turn elevation adjustment knob.

DETAILED DESCRIPTION

Figure 1A:
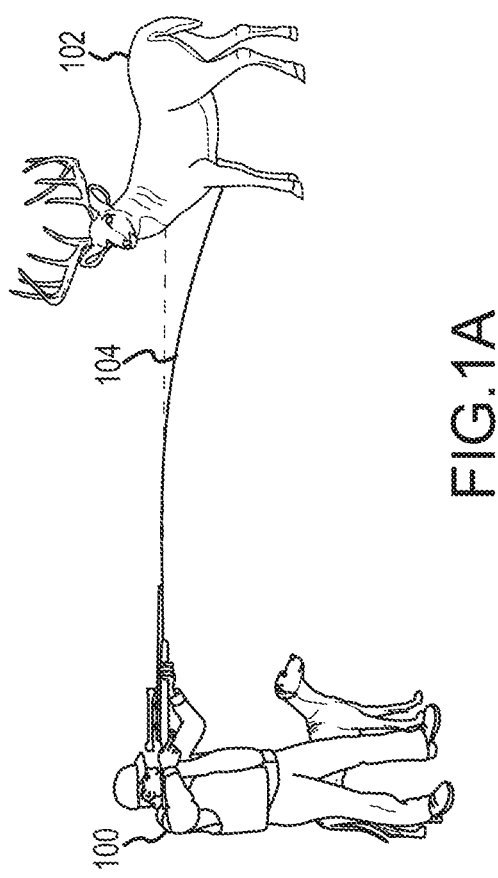
FIGS. 1A-1B depict simplified representations of the effect of gravity on the flight of a bullet.
Figure 1B:
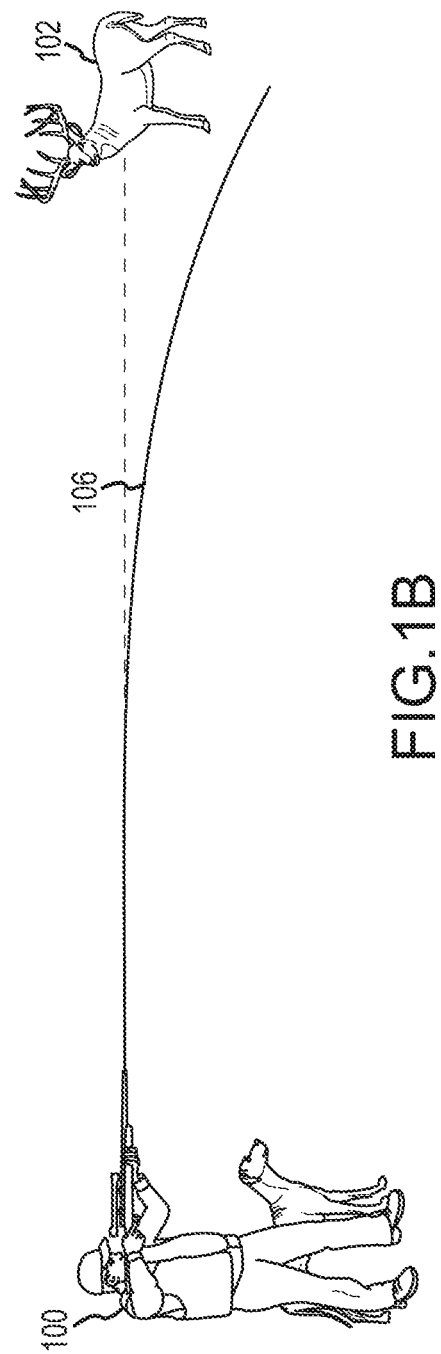

The present technology relates to new and improved embodiments of known sighting systems and methods (such as those described in U.S. Pat. No. 7,703,679, the disclosure of which is hereby incorporated by reference herein in its entirety), for correctly aiming a firearm or other implement. As used herein, a "sighting system" shall be construed broadly and is defined as one or more optical devices and processing systems that assist a person in aiming a projectile launch system, such as a firearm, a rifle, or other implement. The disclosed technology has application in any type of sighting system or optical device, including those with addressable aiming elements and those without. In this application, a riflescope will be described as an exemplary embodiment.

A hunter, sniper, or other person using a rifle or other firearm, commonly referred to as a shooter, uses optical sighting systems, such as riflescopes, to visually acquire a target and improve aiming accuracy. FIGS. 2A-2B depict schematic cross-sectional views of an optical device 200 having a sighting lens system 202 in a first position and a second position, respectively. The optical device 200 includes an outer housing 204 that contains the sighting lens system 202. An ocular lens 206 is disposed proximate an eye 208 of a shooter. An objective lens 210 is disposed opposite the ocular lens 206, also within the outer housing 204. The sighting lens system 202 may include a plurality of lenses (not shown) that can be moved axially along an axis B of the sighting system. The sighting lens system 202 can be inclined relative to an axis A of the optical device housing 204. This inclination angle α is depicted in FIG. 2B. Inclination angle α may be increased by rotating R an elevation adjustment knob 212 disposed on the housing 204. Rotation R of the elevation adjustment knob 212 adjusts a position of an adjustment mechanism 214 so as to pivot the sighting lens system 202. In certain embodiments, the adjustment mechanism 214 can be a lead screw, cam mechanism, slide mechanism, and so on. Other elements utilized to adjust position of the sighting lens system or otherwise accurately aim the optical device (e.g., windage compensation systems, illuminated sighting reticles, etc.) are well-known to a person of skill in the art and thus are not described further. In optical devices utilized for extremely long-range shooting, maximum inclination α of the sighting lens system 202 may necessitate multiple rotations of the elevation adjustment knob 212 (e.g., up to and beyond 180° rotation, 360° rotation, 540° rotation, 720° rotation, 1080° rotation, etc.). Multiple rotations, however, can be difficult to monitor by a shooter, leading to inaccurate shots. The technologies described herein allow a shooter to accurately and precisely know the rotational position of the elevation knob 212 at any point during rotation thereof.

FIG. 3 depicts a partial exploded perspective view of an optical device 300 utilizing a multi-turn elevation adjustment knob 302. The optical device 300 includes a housing 304 having an ocular end 306 and an objective end 308 (an ocular bell housing and lenses are not depicted in FIG. 3). A reference mark 310 is disposed on a surface of the housing 304, proximate a knob mount 312. The knob mount 312 defines a location upon which the knob 302 rests when attached to an adjustment mechanism 314. The adjustment mechanism 314 includes a neck 316 sized so as to receive a plurality of set screws (not shown) disposed on the knob 302. Once secured, rotation of the knob 302 rotates the adjustment mechanism 314, so as to adjust the sighting lens system disposed in the housing 304. A clocking pin or post 318 extends from the knob mount 312 and is fixed so as not to move upon rotation of the knob 302. The function of this post 318 is described in further detail below.

Figure 4:
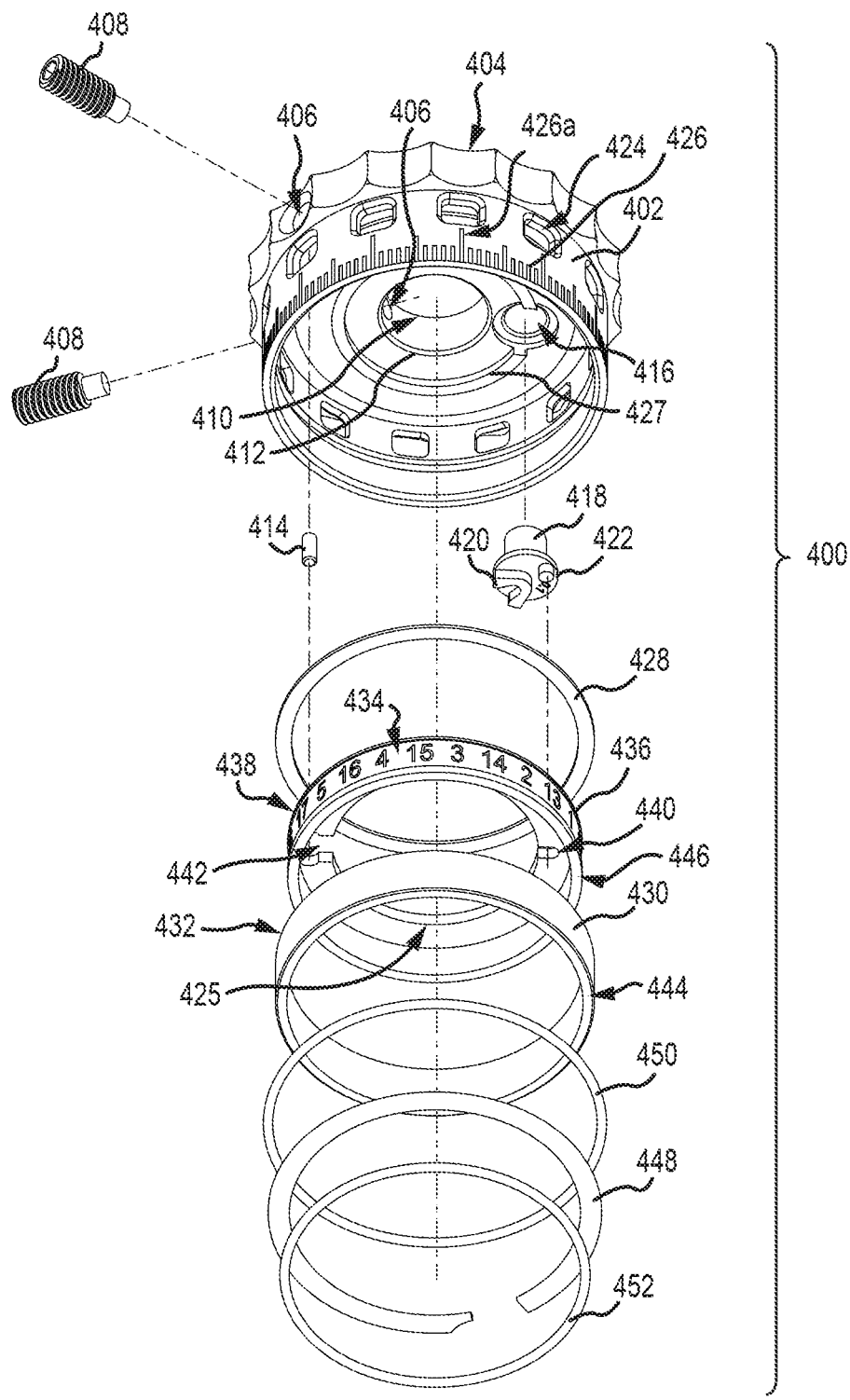
FIG. 4 depicts an exploded perspective view of a multi-turn elevation adjustment knob.

FIG. 4 depicts an exploded perspective view of a multi-turn elevation adjustment knob 400. The elevation adjustment knob 400 includes a housing 402 having a knurled upper portion 404. The housing 402 defines a one or more screw openings 406 configured to receive one or more set screws 408 used to secure the knob 400 to a neck of an adjustment mechanism, such as depicted in FIG. 3. The neck of the adjustment mechanism is received in an adjustment mechanism receiver 410 defined by a shoulder 412 of the housing 402, then secured by the set screws 408. A stop 414, in the form of a pin or other projection, is secured to the housing 402, e.g., at the shoulder 412. The shoulder 412 also defines a gear receiver 416 that pivotably receives a gear or clocking plate 418. The gear 418 includes a U-shaped receiver or clocking plate 420 and a ring engagement member 422, in the form of a pin or other projection.

The housing 402 includes a plurality of see-though portions 424 that in the depicted embodiment are openings defined by the housing 402. In other embodiments, the see-through portions 424 can be substantially transparent windows. In another embodiment, the see-through portions 424 can be defined by transparent portions of a clear plastic housing, where opaque portions have been painted or otherwise covered. A plurality of arc portion indicators 426, including a single reference indicator 426a, are disposed about the housing 402, so as to enable a shooter to know, at any point during rotation, a precise position of the knob 400 relative to the reference mark 310 (FIG. 3). Certain of the plurality of arc portion indicators 426 are aligned with one of the see-though portions 424 to aid in the determination of the rotational position of the knob 400, as described in more detail below.

A number of components are disposed within the housing 402. A gasket 428 is disposed proximate the upper portion 404 of the housing. A substantially transparent ring element 430, having an upper surface 432 in contact with the gasket 428, is disposed proximate the see-through portions 424. Indicia are disposed on an outer surface 434 of an inner indicia ring 436 so as to be visible through the substantially transparent ring element 430. A first set of indicia (numbered 0-11) is disposed in alternating positions with a second set of indicia (numbered 12-23). The inner indicia ring 436 includes a top surface 438 in contact with the shoulder 412 and defines two openings. The first opening is a slot 440 sized to mate with the ring engagement member 422. A stop receiver 442 is adapted to engage the stop 414 when the first indicia are visible through the see-though portions 424, as well as to engage the stop 414 when the second indicia are visible through the see-though portions 424. An inner surface 425 of the inner indicia ring 436 rotates about a pilot 427 that projects from the shoulder 412. Bottom surface 444 of the substantially transparent ring element 430 may be contacted by a ring clip 448 that biases that component toward the gasket 428 so as to maintain a proper seal within the housing 402. In general, a height of the indicia ring 436 is less than a height of the substantially transparent element 430, allowing the indicia ring 436 to rotate freely as described herein. Additional gaskets 450, 452 may further seal the assembly.

Figure 5A:
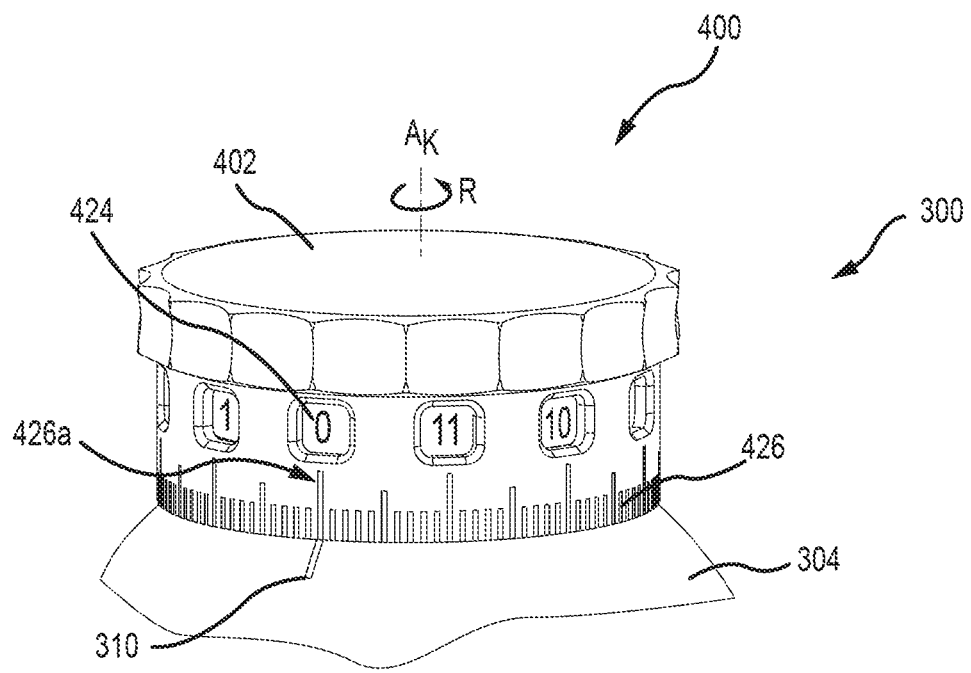
FIG. 5A depicts a partial perspective view of an optical device having a multi-turn elevation adjustment knob displaying first indicia.
Figure 5B:
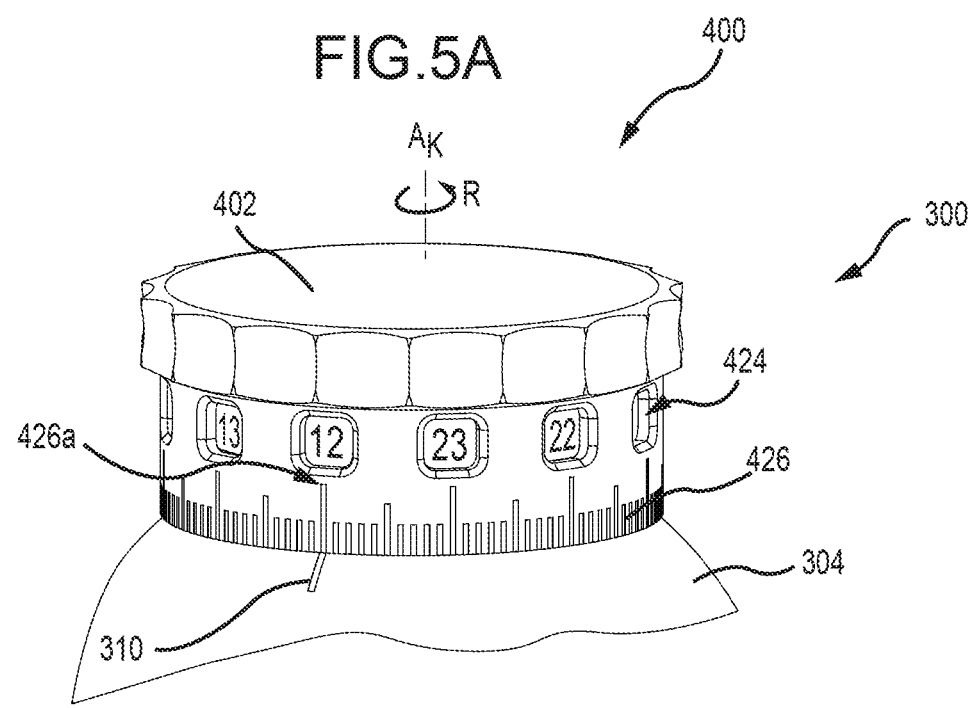
FIG. 5B depicts a partial perspective view of the optical device of FIG. 5A having a multi-turn elevation adjustment knob displaying second indicia.

FIG. 5A depicts a partial perspective view of an optical device 300 displaying first numeric indicia on an elevation adjustment knob 400. FIG. 5B depicts a partial perspective view of the optical device 300 displaying second numeric indicia on the elevation adjustment knob 400. A reference mark 310 on a housing 304, such as that described above in FIG. 3, is also depicted. See-through portions 424 are defined by a housing 402 so as to display therethrough the first indicia (numbers 0-11, FIG. 5A) and the second indicia (numbers 12-23, FIG. 5B). A plurality of arc portion indicators 426 are present on the housing 402. Every tenth arc portion indicator 426 is aligned with one of the see-through portions 424. One of the plurality of arc portion indicators 426 is as the single reference indicator 426a. In the depicted embodiment, the single reference indicator 426a, is aligned with the particular see-through portion 424 that displays indicia 0 and indicia 12. During use, as the knob 400 is rotated R about knob axis $A_K$, a shooter is able to quickly determine the precise position of rotation, and the associated mRad position associated with an inclination of the optical device lens system (not shown). For example, in the depicted embodiment, each of the plurality of arc portion indicators 426 represents 0.1 mRads of adjustment to the angle of inclination of the sighting lens system disposed within the optical device 300. Thus, when a shooter rotates the knob 400 to e.g., the second arc portion indicator 426 after the see-through portion 424 displaying the numeric indicator 4, the shooter quickly knows that he has adjusted the angle of inclination by 4.2 mRads. Further rotation R of the knob 400 causes the second indicia to be displayed through the see-through portions 424. Thus, when a shooter rotates the knob 400 to the eighth arc portion indicator 426 after the see-through portion 424 displaying the numeric indicator 16, the shooter quickly knows that he has adjusted the angle of inclination by 16.8 mRads. In the depicted embodiment, twelve see-though portions 424, each separated by ten arc portion indicators 426 are depicted. Other numbers of see-through portions and arc portion indicators are contemplated.

Figure 6A:
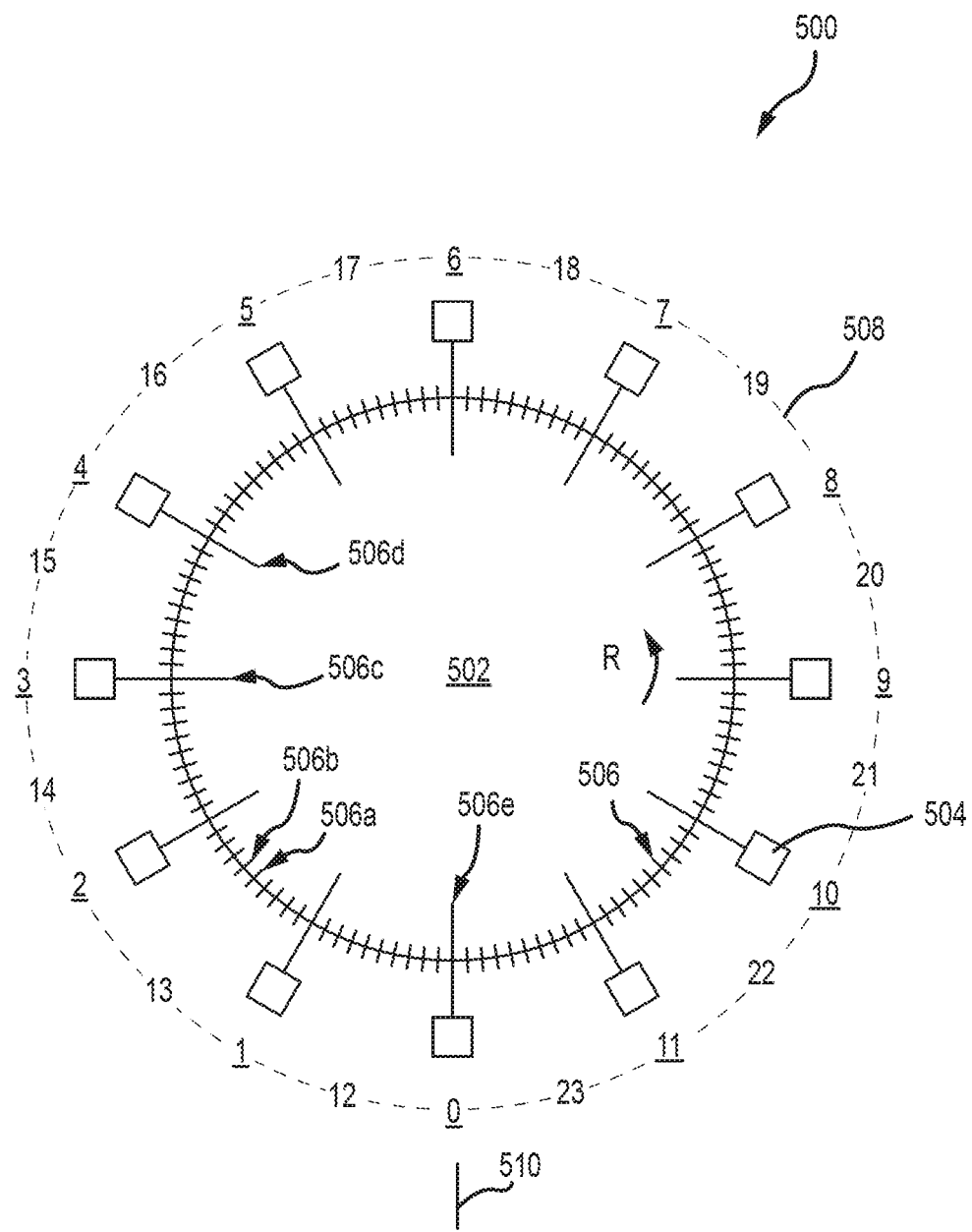
FIGS. 6A-6B depict top schematic views of a multi-turn elevation adjustment knob displaying first numeric indicia and second numeric indicia, respectively.
Figure 6B:
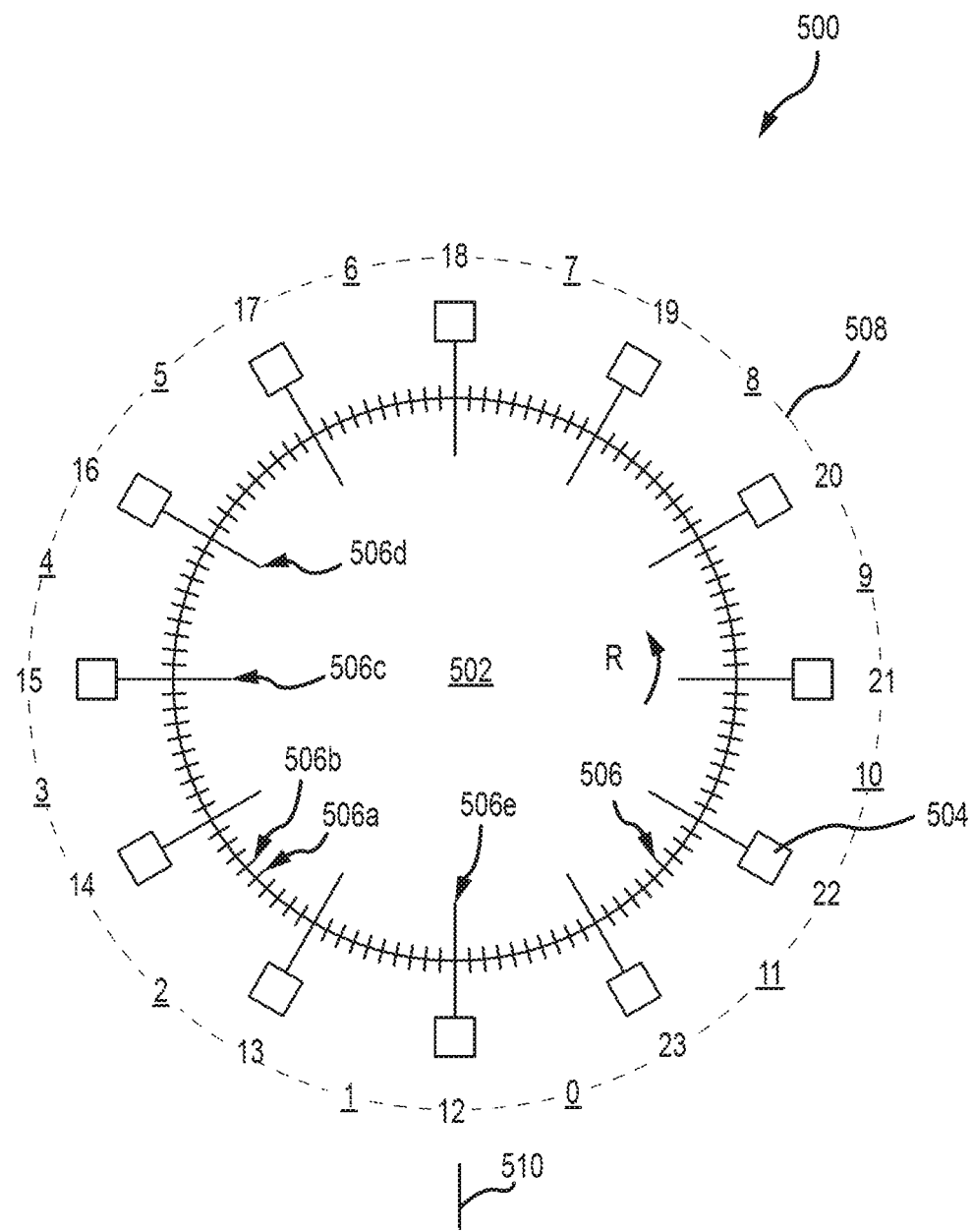

FIGS. 6A-6B depict a top schematic views of a multi-turn elevation adjustment knob 500 displaying first numeric indicia and second numeric indicia, respectively. In these figures, underlined numbers 1-11 are first numeric indicia, while non-underlined numbers 12-23 are second numeric indicia. A knob housing 502 is depicted as a solid-line circle and defines a number of see-through portions 504, which may windows, openings, or other clear portions as described herein. Etched, painted, or otherwise formed on an exterior of the housing 502 are a plurality of arc portion indicators 506 (specific arc portion indicators 506a-506e are identified in the figures). Arc portion indicators can identify a smallest measurable arc portion (e.g., an arc portion bounded by adjacent arc portion indicators 506a, 506b), or can identify a plurality of arc portions (e.g., an arc portion bounded by arc portion indicators 506c, 506d, an arc portion bounded by arc portion indicators 506e, 506c, etc.). In that regard, the knob 500 may be said to define a number of arc portions of various lengths. For example, the knob 500 may include as few as a single arc portion, which would begin and end, e.g., at a single reference indicator 506e. Additionally, the knob 500 can include a total number of arc portions equivalent to the total number of adjacent arc portion indicators 506. In the depicted knob 500, for example, there are 120 total arc portions, as quantified by the total number of adjacent arc portion indicators 506. Certain arc portion indicators (e.g., arc portion indicators 506c, 506d, 506e) are aligned with a see-through portion 504. In certain embodiments, these aligned arc portion indicators 506 can define arc portions on the knob 500. Thus, in the depicted embodiment, twelve arc portions, defined by the twelve see-through portions 504 and their corresponding aligned arc portion indicators 506, are also present.

The first numeric indicia and second numeric indicia are disposed in alternating positions about on an inner ring 508, depicted by a dashed line in FIGS. 6A and 6B. A reference mark 510 is also depicted. The reference mark 510 is fixed relative to the knob housing 502 and the inner ring 508 disposed therein, since these two elements are configured to rotate. Beginning with the configuration depicted in FIG. 6A, the first indicia are initially visible through the see-through portions 504 (and thus are depicted schematically in FIG. 6A as aligned with see-through portions 504). Additionally, the single reference indicator 506e is initially aligned with the reference mark 510. Thus, as a shooter rotates R the knob housing 502, the shooter may quickly determine by how many arc portions he has rotated the knob 500. As each of those arc portions corresponds to 0.1 mRad of lens system elevation adjustment, the shooter quickly knows how much the knob 500 (and therefore the associated optical device) has been adjusted. Beginning at numeric indicia 0, a rotation R to the see-though portion 504 aligned with the tenth arc portion indicator 506 away from the single reference indicator 506e, allows the shooter to quickly recognize that he has made a full 1.0 mRad (ten arc portion indicators 506 at 0.1 mRad each) of adjustment to the optical device, using the reference mark 510 as a datum. More conveniently, the tenth arc portion indicator 506 is also aligned with the see-through portion 504 that displays numeral "1" therethrough. Thus, the shooter is quickly able to confirm that he has, indeed, made 1.0 mRad of adjustment. This is the case for each see-through portion 504. Thus, each of the first numeric indicia 1-11, as viewed through a specific see-through portion 504, are therefore associated with a single specific rotated position of the housing 502, relative to the reference mark 510. Continuing rotation R, for example, to six arc portion indicators 506 past the see-through portion 504 displaying the numeral "7" allows the shooter to quickly determine that he has made a 7.6 mRad adjustment to the optical device, again using the reference mark 510 as a datum. As the knob 500 is rotated further, the see-through portion 504 displaying the numeral 11 is ultimately aligned with the reference mark 510, indicating an 11 mRad adjustment, again with reference mark 510 as a datum.

As the single reference indicator 506e is brought into alignment with the reference mark 510 after a full 360° rotation R, a mechanism (described below) within the knob housing 502 rotates the ring 508, relative to the housing 502. This causes a shift of the inner ring 508, such that the second indicia are aligned with the see-through portions 504. This alignment continues as the knob 500 is further rotated R, allowing the shooter to continue to quickly and accurately determine how much the optical device has been adjusted, even after a complete initial 360° rotation thereof. Thus each of the second numeric indicia 12-23, as viewed through a specific see-through portion 504, are therefore associated with a single, specific second rotated position of the housing 502, relative to the reference mark 510. For example, a rotation to the three arc portion indicators 506 past the see-through portion 504 displaying the numeral "19" allows the shooter to quickly determine that he has made a 19.3 mRad adjustment to the optical device, again with the reference mark 510 as a datum. Although twelve see-though portions 504 are depicted in FIGS. 6A and 6B, other numbers of see-through portions 504 may be utilized. The numerals used for the second indicia, in that case, may correspond to a total number of arc portions plus a constant. In certain embodiments, such as the embodiment depicted in FIGS. 6A and 6B, the constant is equal to the total number of see-through portions 504 on the housing 502. In other embodiments (e.g., embodiments where greater than 360° of rotation are possible) the constant may be a multiple of the total number of see-thorough portions. Additionally, although mRads are the measurement used in the above embodiment, adjustments may also be made on a Minute of Angle (MOA) system.

FIGS. 7A-7F depict partial cross-sectional views of an optical device 600 having a multi-turn elevation adjustment knob 400 displaying first numeric indicia, then second numeric indicia. Reference indicators used for components depicted in FIGS. 7A-7F are generally those used in FIGS. 3 and 4. Not all components identified are necessarily described further. A knob 400 includes an outer housing 402 that can be gripped and rotated by a shooter. An inner ring 436 is disposed within the housing 402 and displays first numeric indicia 0-11 through a plurality of see-through portions 424. For clarity, the indicia 0-11 displayed are depicted in the figure, even though they would not be visible in this view. The knob 400 is secured to an adjustment mechanism 314 by a set screw (not shown). A gear 418 includes a receiver 420 and a ring engagement member 422, engaged with a slot 440 in the inner ring 436. A stop 414 connected to the knob housing 402 is engaged with a first end of a stop receiver 442. A clocking pin or post 318 is fixed relative to the optical device 600 so as to be stationary during any rotation of the knob 400, as is a reference mark 310 that is disposed on the optical device 600. The other components rotate, as described below. In the "zero position" depicted in FIG. 7A, an outer portion of the receiver 420 is disposed proximate the post 318. In another embodiment, the center portion of the receiver 420 may contact the post 318, which prevents clockwise rotation $R_{CW}$, but allows for counterclockwise rotation $R_{CCW}$. This helps ensure that the indicia 0 is visible through the see-through portion 422 that is aligned with the reference mark 310.

Figure 7A:
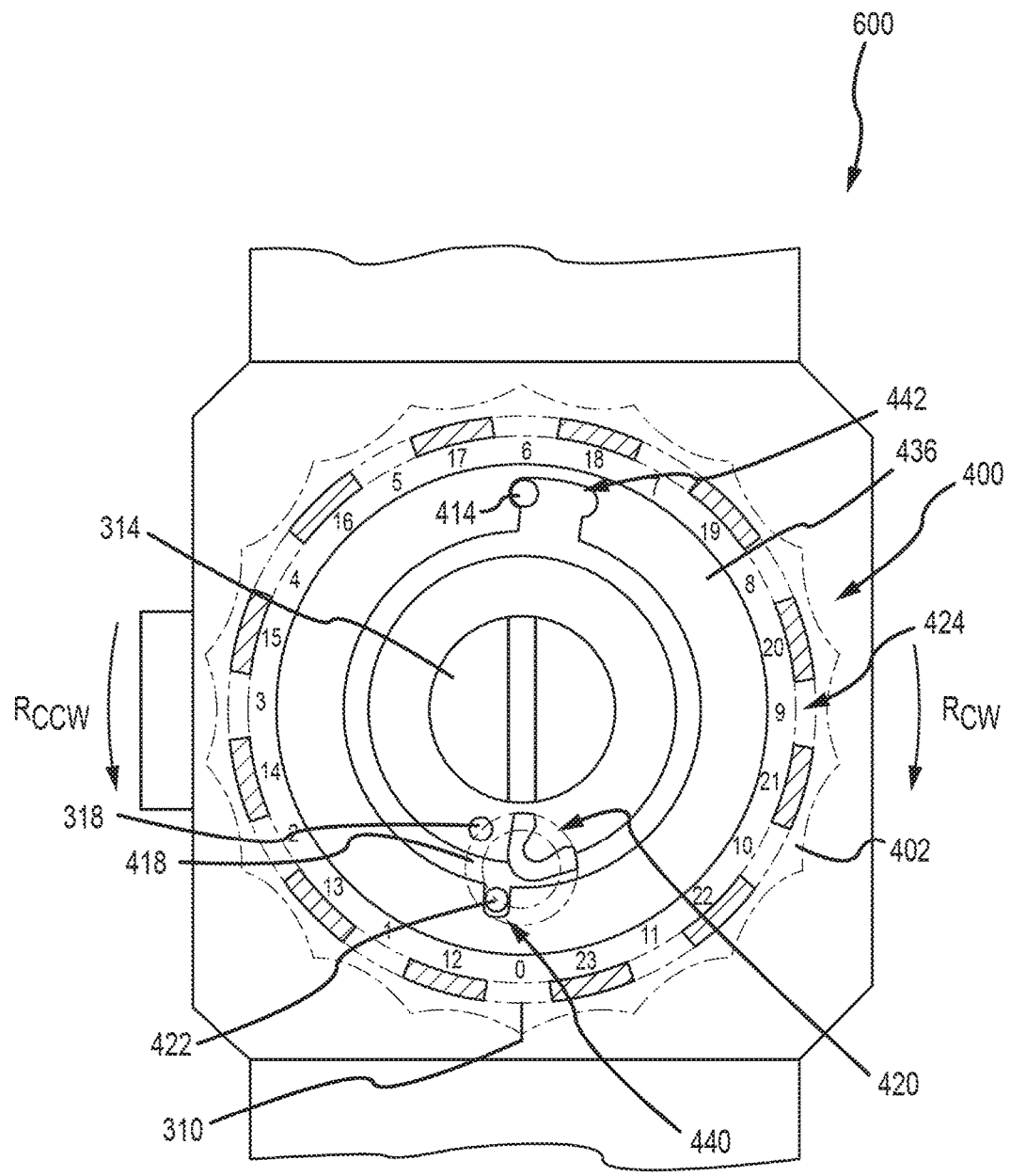
FIGS. 7A-7F depict partial cross-sectional views of an optical device having a multi-turn elevation adjustment knob displaying first, then second, indicia.
Figure 7B:
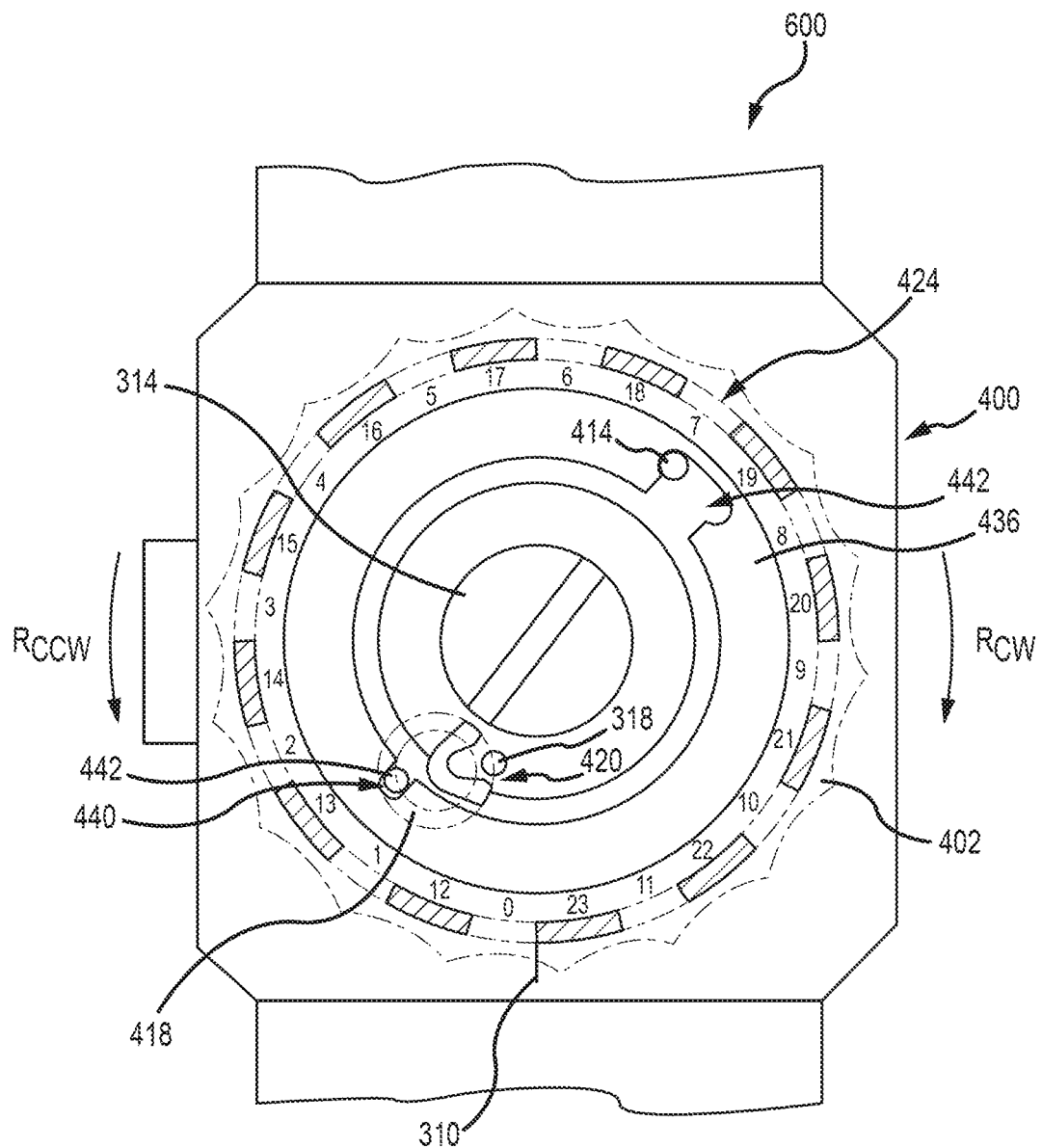
Figure 7C:
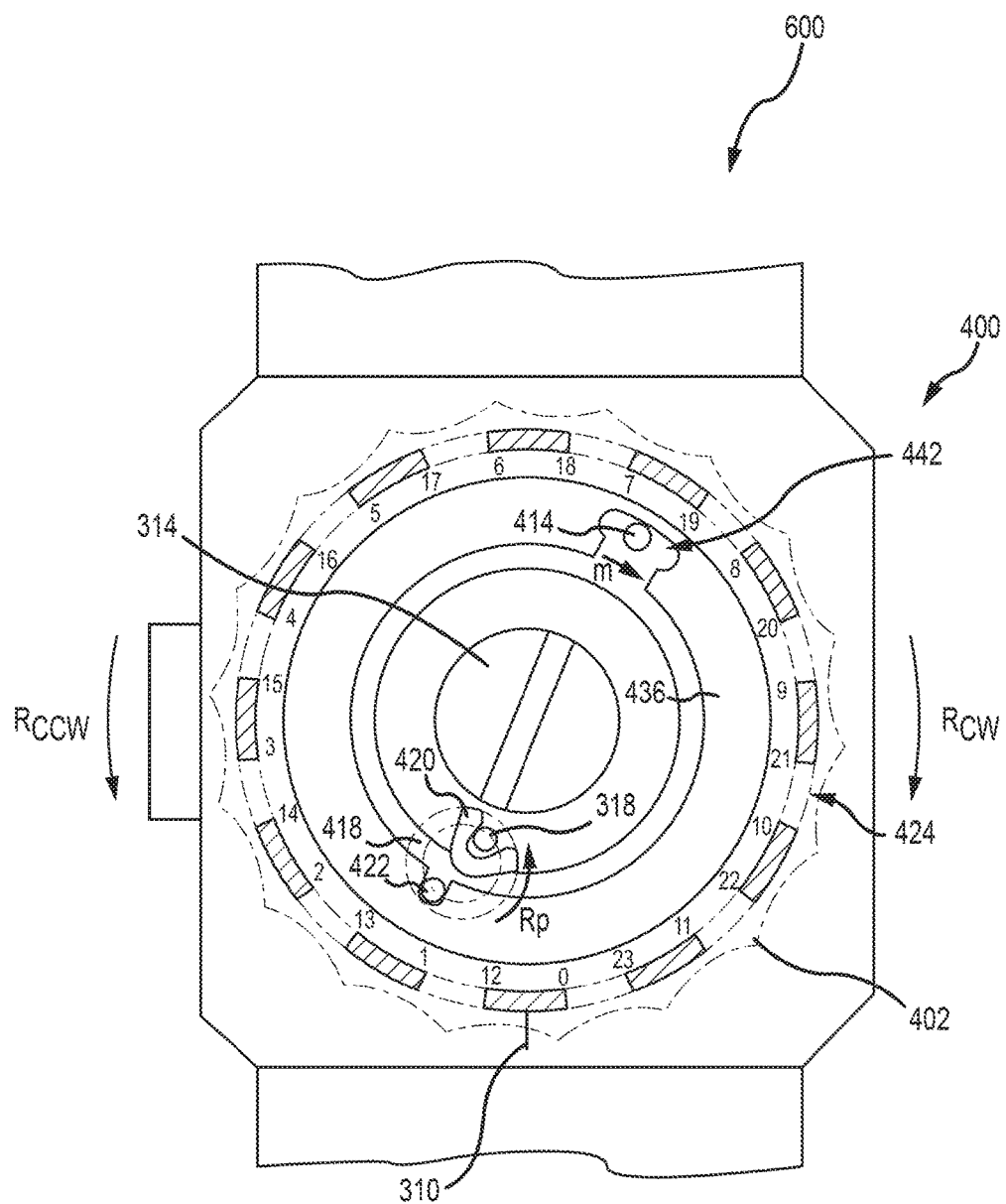

FIG. 7B depicts the knob 400 approaching the completion of an initial 360° of counter clockwise rotation $R_{CCW}$. During this initial first full rotation, beginning at indicia 0, each of the arc portion indicators (FIGS. 6A-6B) have been aligned with reference mark 310, thereby providing a shooter with information about elevation adjustment of the optical device 600. Moreover, as each see-through portion 424 aligns with the reference mark 310, further information (in the form of first indicia 1-11) is provided to the shooter, who may easily understand the elevation setting of the optical device 600. As the knob 400 approaches the position depicted in FIG. 7B, the receiver 420 is positioned so as to receive the post 318. Of course, at any time during the initial 360° of counter clockwise rotation $R_{CCW}$, the shooter may rotate the knob 400 in a clockwise rotation $R_{CW}$, so as to reduce elevation adjustment in the optical device 600. In FIG. 7C, the stationary condition of the post 318 compels rotation $R_P$ of the gear 418. Thus, the receiver 420 acts as a clocking plate and the post 318 acts as a clocking pin. This rotation $R_P$ shifts the position of the ring engagement member 422 which, in turn, shifts the position of the inner ring 436. This shift is depicted in FIG. 7C, where the inner ring 436 moves M from contact with a first end of the stop receiver 442 towards a second end of the stop receiver 442. After this movement M, the stop 414 is disposed in an opposite end from its original position. This shift of the inner ring 436 moves first indicia 0-11 out of alignment with the see-through portions 424 and second indicia 12-23 into alignment with the see-through portions 424.

Figure 7D:
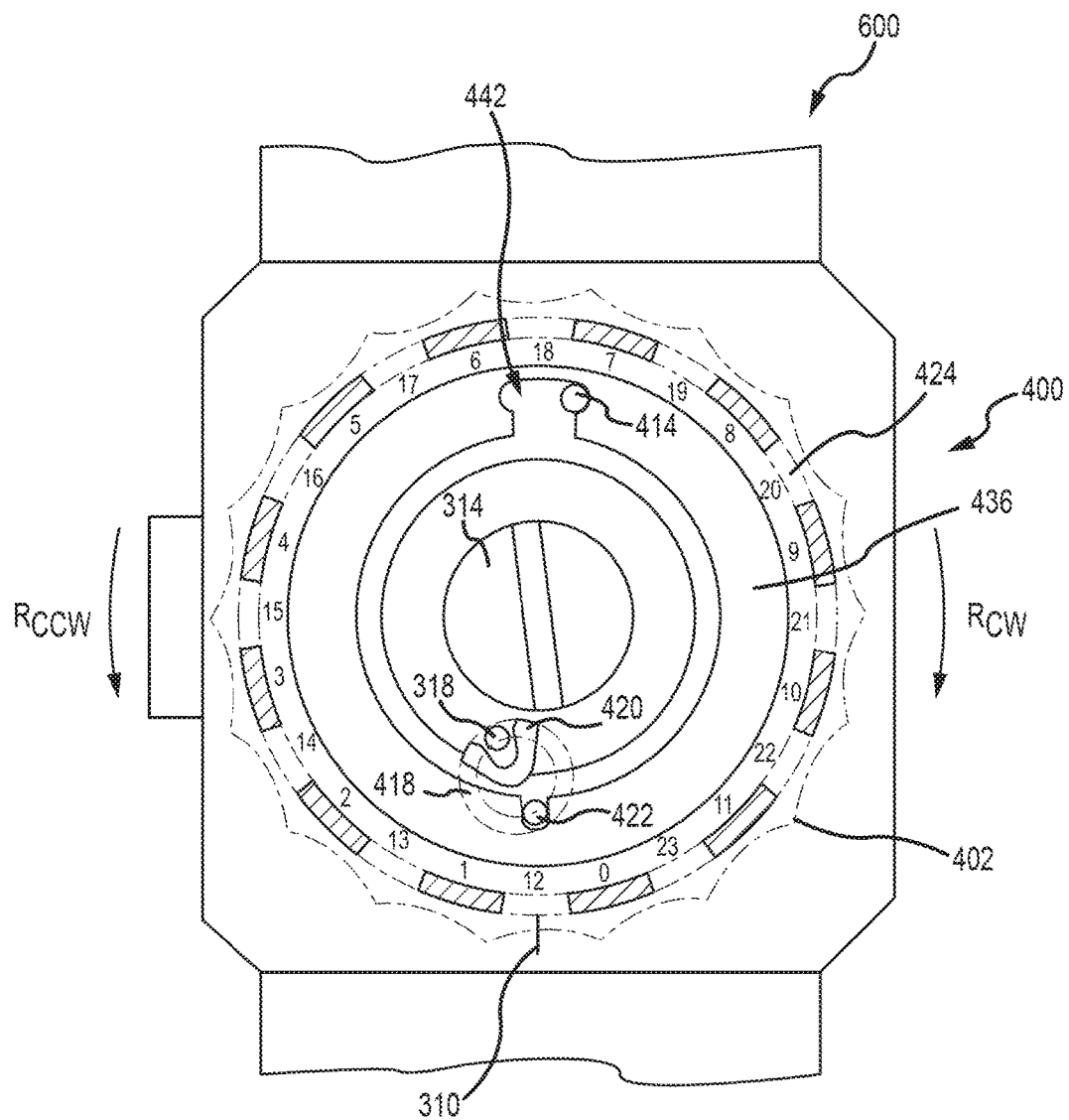

FIG. 7D depicts the knob 400 as it begins a second 360° of counter clockwise rotation $R_{CCW}$, wherein the second indicia 12-23 are aligned with see-though portions 424 such that the shooter can derive information about elevation adjustment quickly and accurately. Advantageously, embodiments of knobs such as described herein allow the shooter to continue to align arc portion indicators (FIGS. 6A-6B) with reference mark 310, thereby providing a shooter with information about elevation adjustment of the optical device 600. Moreover, as each see-through portion 424 aligns with the reference mark 310, further information (in the form of second indicia 12-23) is provided to the shooter, who may easily understand the elevation setting of the optical device 600. Since both the indicia visible through see-through portions 424 and the arc portion indicators are disposed proximate the reference mark 310 at all times during rotation of the knob 400, accuracy is ensured.

Figure 7E:
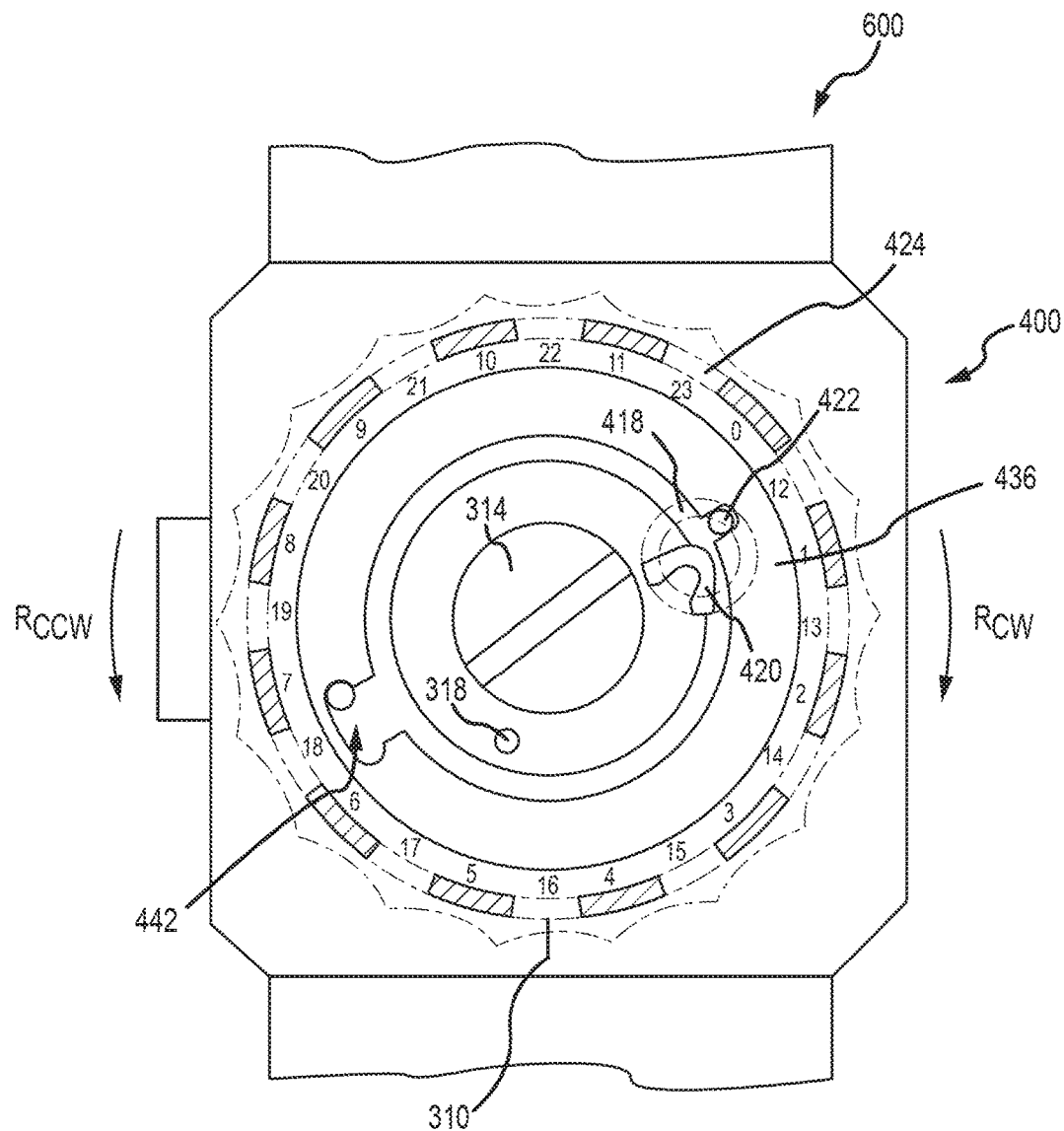
Figure 7F:
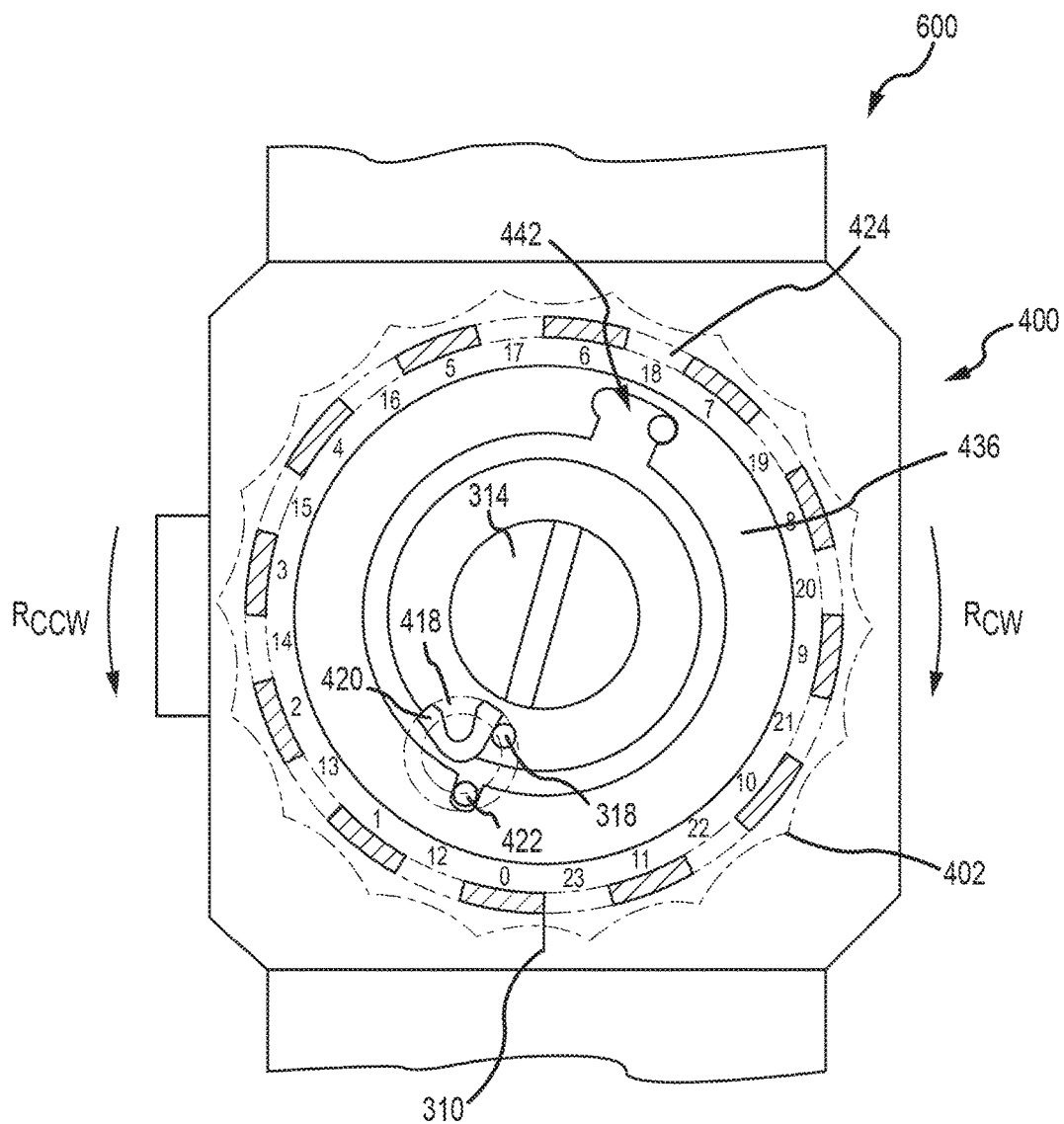

FIG. 7E depicts further rotation of the knob 400 in the second 360° of counter clockwise rotation $R_{CCW}$, wherein second indicia 12-23 are visible through the see-through portions 424. Also, during the second 360° of counter clockwise rotation $R_{CCW}$, the stop 414 remains engaged with the second end of the stop receiver 442. At any time during the second 360° of counter clockwise rotation $R_{CCW}$, rotation may be reversed to a clockwise rotation $R_{CW}$. If rotated clockwise $R_{CW}$ sufficiently, the receiver 420 may again receive the post 318, causing an opposite shift in the inner ring 436, such that the first indicia 0-11 are again visible through see-through portions 424. This condition would remain through further clockwise rotation $R_{CW}$ until the indicia 0 is re-aligned with the reference mark 310. FIG. 7F depicts the knob 400 at the end of the second 360° of counter clockwise rotation $R_{CCW}$. Here, an outer portion of the receiver 420 contacts the post 318. This contact, in conjunction with engagement between the stop 414 and the stop receiver 442, forms a mechanical lock against further counter clockwise rotation $R_{CCW}$ of the knob 400.

Other embodiments of multi-turn knobs are contemplated. For example, the technologies disclosed herein can accommodate knobs that may be turned through three, four, five, or more 360° rotations. In certain multi-turn knob embodiments, multiple posts may be secured to the inner ring 436 so as to act similar to the ring engagement members 422 depicted in FIGS. 7A-7F. These posts may be engaged and turned by a gear mechanism that translates a continuous rotation (of the knob housing) into an intermittent rotary motion (of the inner ring). In one example, such a gear mechanism may be a Geneva mechanism or other mechanism known in the art. In such an embodiment, the total number of total rotations of the knob would correspond to the number of alternating indicia on the outer surface of the ring. That is, a four-turn knob may be configured to display four discrete sets of indicia. An appropriate number of pins may be selected to ensure proper shifting of the inner ring for each discrete set of indicia. Of course, the size of the see-through portions and the size of the numbers would have to be calibrated so as to display the proper indicia during the appropriate rotation. Additional numbers of pins, sets of indicia, and total numbers of rotations are contemplated.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. An apparatus comprising:
   an optical device comprising a reference disposed on an outer surface of the optical device; and
   a knob rotatably connected to the optical device proximate the reference, the knob comprising:
      a housing comprising a plurality of see-though portions; and
      an inner ring disposed within the housing, wherein the inner ring comprises:
         first numeric indicia associated with a first rotated position of the housing relative to the reference, wherein the first numeric indicia are aligned with at least one of the plurality of see-through portions when the knob is in a first position; and
         second numeric indicia associated with a second rotated position of the housing relative to the reference, wherein the second numeric indicia are aligned with at least one of the plurality of see-through portions when the knob is in a second position.

2. The apparatus of claim 1, further comprising a stop extending from the housing and engaged with the inner ring when both the first numeric indicia and the second numeric indicia are visible through the plurality of see-through portions.

3. The apparatus of claim 2, wherein engagement between the stop and the inner ring when the first numeric indicia is visible, and contact between the post and an outer portion of the receiver, prevents a further rotation of the knob.

4. The apparatus of claim 2, wherein engagement between the stop and the inner ring when the second numeric indicia is visible, and contact between the post and an outer portion of the receiver prevents a further rotation of the knob.

5. The apparatus of claim 1, wherein the plurality of see-though portions comprise openings defined by the housing.

6. The apparatus of claim 5, further comprising a substantially transparent ring disposed between the inner ring and the housing, wherein the first numeric indicia and the second numeric indicia are selectively visible through the openings and the substantially transparent ring.

7. The apparatus of claim 1, wherein a rotating movement of the knob adjusts an angular position of at least one element disposed in the optical device.

8. An apparatus comprising:
   a knob housing comprising:
      a knurled portion;
      a plurality of arc portion indicators disposed about an outer surface of the knob housing;
      a plurality of see-through portions defined by the knob housing and disposed between the knurled portion and the plurality of arc portion indicators; and
   an inner ring disposed within the knob housing, wherein the inner ring comprises:
      a plurality of first indicia aligned with the plurality of see-through portions when the knob housing is in a first rotated position; and
      a plurality of second indicia aligned with the plurality of see-through portions when the knob housing is in a second rotated position.

9. The apparatus of claim 8, wherein the plurality of first indicia and the plurality of second indicia are disposed in alternating positions about the inner ring.

10. The apparatus of claim 8, wherein the see-through portions comprise openings defined by the housing.

11. The apparatus of claim 8, further comprising a stop extending from the housing and engaged with the inner ring when both the plurality of first indicia and the plurality of second indicia are visible through the plurality of see-through portions.

12. The apparatus of claim 1, wherein the first numeric indicia is different than the second numeric indicia.

13. The apparatus of claim 1, wherein the first numeric indicia comprise a plurality of first numeric indicia, and wherein the second numeric indicia comprise a plurality of second numeric indicia.

14. The apparatus of claim 13, wherein each of the plurality of first numeric indicia and the plurality of second numeric indicia are unique.

15. The apparatus of claim 1, wherein the knob further comprises:
   a knurled upper portion; and
   a plurality of arc portion indicators disposed about a perimeter of the housing.

16. The apparatus of claim 15, wherein the plurality of see-though portions are disposed between the knurled upper portion and the plurality of arc portion indicators.

17. The apparatus of claim 15, wherein the plurality of see-though portions are disposed proximate the knurled upper portion.

18. The apparatus of claim 1, wherein the second numeric indicia comprise the first numeric indicia plus a constant.

19. The apparatus of claim 8, wherein the arc portion indicators comprise a reference indicator.

20. The apparatus of claim 19, wherein the reference indicator is aligned with at least one of the plurality of see-through portions.

21. The apparatus of claim 8, wherein the apparatus comprises an optical device.

22. The apparatus of claim 21, wherein the optical device comprises a reference disposed on an outer surface of the optical device, wherein the reference is configured to align with at least one of the arc portion indicators.

23. The apparatus of claim 8, further comprising a set screw.

24. The apparatus of claim 23, wherein the knob housing defines an opening for receiving the set screw.

\* \* \* \* \*